(12) United States Patent
Rydnell et al.

(10) Patent No.: US 10,104,703 B2
(45) Date of Patent: Oct. 16, 2018

(54) NODE AND METHOD FOR ESTABLISHING DIRECT COMMUNICATIONS

(71) Applicant: Telefonaktiebolaget L M Ericsson (publ), Stockholm (SE)

(72) Inventors: Gunnar Rydnell, Göteborg (SE); Hans Bertil Rönneke, Kungsbacka (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 161 days.

(21) Appl. No.: 14/891,049

(22) PCT Filed: May 14, 2013

(86) PCT No.: PCT/EP2013/059905
§ 371 (c)(1),
(2) Date: Nov. 13, 2015

(87) PCT Pub. No.: WO2014/183781
PCT Pub. Date: Nov. 20, 2014

(65) Prior Publication Data
US 2016/0088664 A1    Mar. 24, 2016

(51) Int. Cl.
*H04W 76/10* (2018.01)
*H04W 4/70* (2018.01)
*H04W 8/08* (2009.01)
*H04W 28/02* (2009.01)
*H04W 60/00* (2009.01)
(Continued)

(52) U.S. Cl.
CPC .............. *H04W 76/10* (2018.02); *H04W 4/70* (2018.02); *H04W 8/08* (2013.01); *H04W 8/082* (2013.01); *H04W 28/0215* (2013.01);
*H04W 60/00* (2013.01); *H04L 61/1588* (2013.01); *H04L 61/6054* (2013.01); *H04W 92/06* (2013.01)

(58) Field of Classification Search
None
See application file for complete search history.

(56) References Cited

U.S. PATENT DOCUMENTS

| 9,392,634 B2 * | 7/2016 | Ronneke ............ H04W 76/028 |
| 9,894,511 B2 * | 2/2018 | Qiang ................... H04W 4/70 |
| 2012/0202508 A1 | 8/2012 | Toth et al. |

(Continued)

OTHER PUBLICATIONS

ZTE, "Update Generic NAS Transport Solution", SA WG2 Temporary Document SA WG2 Meeting #94, S2-124402, 3GPP Draft, S2-124402, 3rd Generation Partnership Project (3GPP), Mobile Competence Centre, 650, Route Des Lucioles, F-06921 Sophia-Antipolis Cedex, France, vol. SA WG2, No. New Orleans, USA, Nov. 6, 2012, XP050684054, 6 pages.

(Continued)

*Primary Examiner* — Xavier Szewai Wong
(74) *Attorney, Agent, or Firm* — Rothwell, Figg, Ernst & Manbeck, P.C.

(57) ABSTRACT

Example embodiments presented herein are directed towards providing direct communications between a mobility management node (e.g., SGSN, S4-SGSN or MME) and an MTC-IWF node via a T5 interface. With the use of the direct communications unnecessary queries to a HSS or HLR may be avoided. The direct communications are established by the mobility management node and the MTC-IWF node saving identifying information of the other node.

18 Claims, 9 Drawing Sheets

(51) Int. Cl.
*H04W 92/06* (2009.01)
*H04L 29/12* (2006.01)

(56) References Cited

U.S. PATENT DOCUMENTS

| | | | | |
|---|---|---|---|---|
| 2012/0307764 | A1* | 12/2012 | Zhao | H04W 28/24 370/329 |
| 2013/0265937 | A1* | 10/2013 | Jain | H04W 4/005 370/328 |
| 2013/0329653 | A1* | 12/2013 | Russell, Jr. | H04W 4/005 370/329 |
| 2014/0092808 | A1* | 4/2014 | Jain | H04W 52/0258 370/328 |
| 2014/0112251 | A1* | 4/2014 | Kim | H04W 8/22 370/328 |
| 2014/0286162 | A1* | 9/2014 | Kim | H04W 8/02 370/230 |
| 2014/0341041 | A1* | 11/2014 | Velev | H04Q 3/0045 370/236 |
| 2015/0215725 | A1* | 7/2015 | Xu | H04W 4/005 455/422.1 |

OTHER PUBLICATIONS

CATT, "MTC-IWF selection for Uplink small data", SA WG2 Temporary Document SA WG2 Meeting #95, S2-130248, 3GPP Draft, S2-130248_MME_FIND_IWF_V0, 3rd Generation Partnership Project (3GPP), Mobile Competence Centre, 650, Route Des Lucioles, F-06921 Sophia-Antipolis Cedex, France, vol. SA WG2 No. Prague, Czech Republic, Jan. 22, 2013, XP050684798, 6 pages.
3GPP TR 23.887 V0.8.0 (Feb. 2013), "3rd Generation Partnership Project; Technical Specification Group Services and System Aspects; Machine-Type and other Mobile Data Applications Communications Enhancements (Release 12)", 3GPP TR 23.887, 3rd Generation Partnership Project (3GPP), Mobile Competence Centre, 650, Route Des Lucioles, F-06921 Sophia-Antipolis Cedex, France, vol. SA WG2, No. V0.8.0, Feb. 12, 2013, pp. 1-107.
3GPP TR 23.6872 V11.3.0 (Jan. 2012), "3rd Generation Partnership Project; Technical Specification Group Services and System Aspects; Architecture enhancements to facilitate communications with packet data networks and applications (Release 11)" 3GPP TS 23.682, 3rd Generation Partnership Project (3GPP), Mobile Competence Centre, 650, Route Des Lucioles, F-06921 Sophia-Antipolis Cedex, France, vol. SA WG2, No. V11.3.0, Dec. 18, 2012, pp. 1-29.
"3rd Generation Partnership Project; Technical Specification Group Services and System Aspects; Circuit Switched (CS) fallback in Evolved Packet System (EPS); Stage 2 (Release 11)", 3GPP TS 23.272 V11.4.0 (Mar. 2013), 91 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.0.0 (Mar. 2013), 290 pages.

* cited by examiner

US 10,104,703 B2

NODE AND METHOD FOR ESTABLISHING DIRECT COMMUNICATIONS

CROSS-REFERENCE TO RELATED APPLICATION

This application is a 35 U.S.C. § 371 National Phase Entry Application from PCT/EP2013/059905, filed May 14, 2013, and designating the United States.

TECHNICAL FIELD

Example embodiments are directed towards the establishment and management of direct communications between a mobility management node and an MTC-IWF node via a T5 interface in a communications network.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

One category of user equipments is Machine-to-Machine (M2M) devices. M2M devices typically engage in infrequent and small data communications. Thus, various communication methods are specified for M2M communications in order to save system resources.

SUMMARY

Currently, when an M2M device wishes to engage in communications with an MTC application server, the M2M device will send such communications via a mobility management node, further via a MTC-IWF and via a SCS. For each communication sequence, the mobility management node will query the HSS/HLR to obtain information on which MTC-IWF node is serving the M2M device associated with the requested communications. Similarly for downlink data, the MTC-IWF may send a query to the HSS/HLR to obtain information on the mobility management node serving the M2M device for which the downlink data is intended for.

Accordingly, some of the example embodiments are directed towards a method, in a mobility management node (e.g., a MME, SGSN, S4-SGSN), for establishing direct communications between the mobility management node and a MTC-IWF node, where the MTC-IWF serves a M2M device. The method comprises receiving, from a node (e.g., the M2M device or the MTC-IWF node), a communications related request comprising an information element indicating a need to establish direct communications between the mobility management node and the MTC-IWF. The method further comprises determining the MTC-IWF node serving the M2M device. The method also comprises saving, within the mobility management node, an address of the MTC-IWF node.

Some of the example embodiments are directed towards the mobility management node for establishing direct communications between the mobility management node and the MTC-IWF node, where the MTC-IWF is serving the M2M device. The mobility management node comprises communication port configured to receive, from a node, a communications related request comprising an information element indicating a need to establish direct communications between the mobility management node and the MTC-IWF. The mobility management node further comprises processing circuitry configured to determine the MTC-IWF node serving the M2M device. The processing circuitry is further configured to save, within the mobility management node, an address of the MTC-IWF node.

Some of the example embodiments are directed towards a method, in a MTC-IWF node, for establishing direct communications between the MTC-IWF node and a mobility management node establishing a connection with a M2M device. The method comprises receiving, from the mobility management node, an update request comprising an indication to establish direct communications with the mobility management node. The update request comprises an address of the mobility management node and an identification of the M2M device. The method also comprises saving the address of the mobility management node and the identification of the M2M device within the MTC-IWF node.

Some of the example embodiments are directed towards a MTC-IWF node for establishing direct communications between the MTC-IWF node and a mobility management node establishing a connection with a M2M device. The MTC-IWF node comprises radio circuitry configured to receive, from the mobility management node, an update request. The update request comprises an indication to establish direct communications with the mobility management node. The update request comprises an address of the mobility management node and an identification of the M2M device. The MTC-IWF node also comprises processing circuitry configured to save the address of the mobility management node and the identification of the M2M device within the MTC-IWF node.

An example advantage of some of the example embodiments presented herein may be providing an efficient use of the T5 interface between the mobility management node and the MTC-IWF. Another example advantage of some of the example embodiments presented herein is improved use of the T5 interface in view of mobility management procedures.

Definitions

3GPP Third Generation Partnership Project
AS Application Server
AS Access Stratum
BSC Base Station Controller
EPC Evolved Packet Core
EPS Evolved Packet System
E-UTRAN Evolved Universal Terrestrial Radio Access Network
GERAN GSM/EDGE Radio Access Network
GPRS General Packet Radio Service
GSM Global System for Mobile Communications
HLR Home Location Register
HSS Home Subscriber Server
IMSI International Mobile Subscriber Identity
IP Internet Protocol
IWF InterWorking Function
LTE Long Term Evolution
M2M Machine-to-Machine
MME Mobility Management Entity
MO Mobile Originated
MT Mobile Terminated
MTC Machine Type Communication
NAS Non-Access Stratum
PDN Packet Data Network
PGW PDN Gateway
RAN Radio Access Network
RBS Radio Base Station
RNC Radio Network Controller
SCS Service Capability Server
SGSN Serving GPRS Support Node
SGW Serving Gateway
TAU Tracking Area Update
UE user equipment
UL Uplink
UMTS Universal Mobile Telecommunications System
UTRAN UMTS Terrestrial Radio Access Network
WCDMA Wideband Code Division Multiple Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

It should be appreciated that all of the example embodiments presented herein may be applicable to a GERAN, UTRAN or E-UTRAN based system. In all explanations and examples provided, a mobility management node may be a MME, SGSN or a S4-SGSN (even if only a MME is cited in the example). It should further be appreciated that the terms M2M device, MTC device and MTC UE device may be used interchangeably.

General Overview

Figure 1:
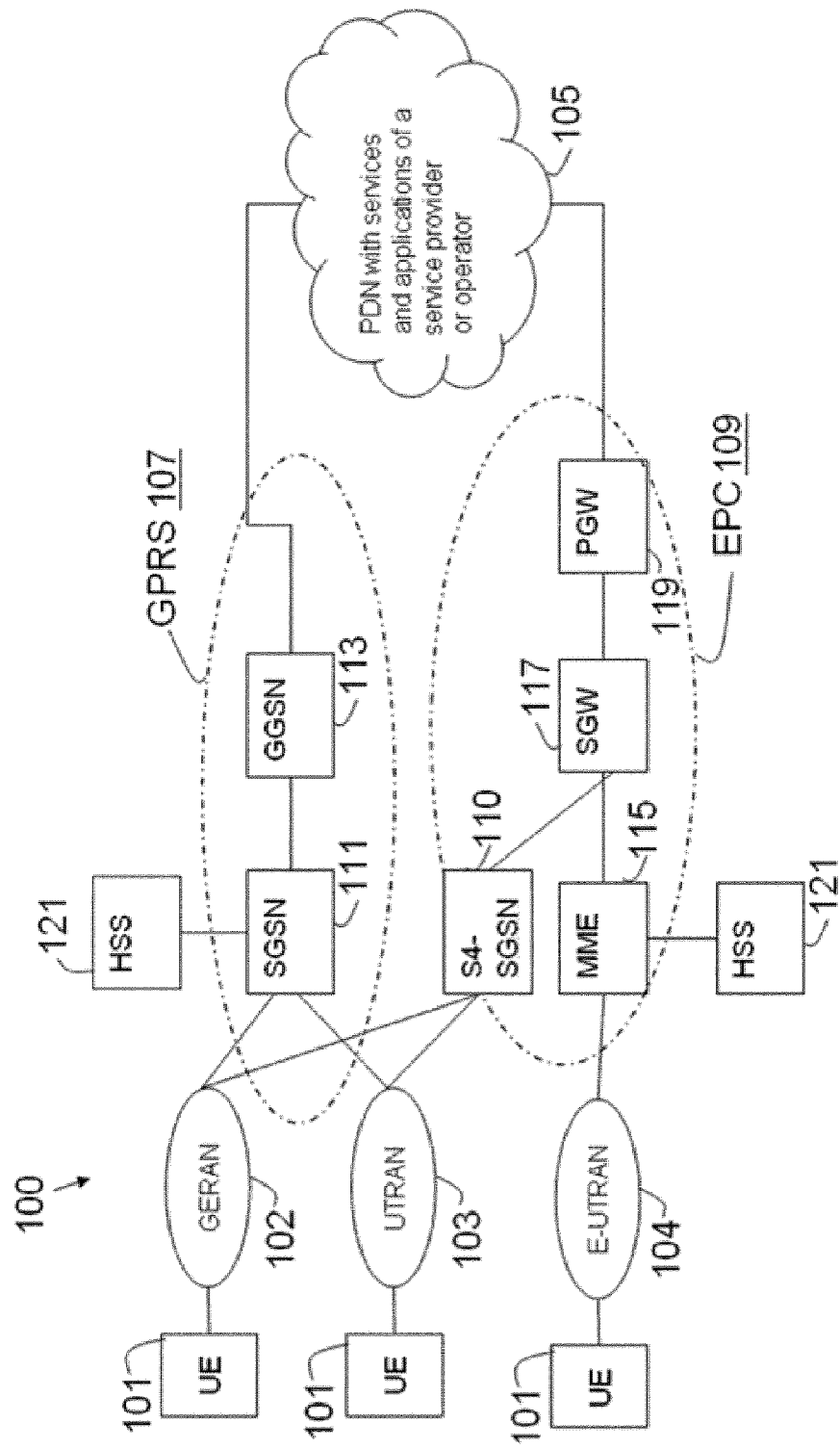
FIG. 1 an illustration of an example wireless communications network.

In order to provide a better explanation of the example embodiments presented herein, a problem will first be identified and discussed. FIG. 1 provides a general example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to the operator or application server 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, and mobility management. The GPRS subsystem 107 may also include a Gateway GPRS Support Node 113, which may be responsible for the interworking between the GPRS subsystem 107 and the operator or application server 105.

The EPC subsystem 109 may comprise a Mobility Management Entity 115, which may be responsible for idle mode UE tracking, paging procedures, and attachment and activation processes. The EPC subsystem may also comprise a Serving Gateway (SGW) 117, which may be responsible for the routing and forwarding for data packets. The EPC subsystem may also include a Packet data network Gateway (PGW) 119, which may be responsible for providing connectivity from the user equipment 101 to the operator of application servers 105. Both the SGSN 111 and the MME 115 may be in communication with a Home Subscriber Server (HSS) 121, which may provide device subscription information, location information etc, based on an International Mobile Subscriber Identity (IMSI). It should be appreciated that the EPC subsystem 109 may also comprise a S4-SGSN 110, thereby allowing the GERAN 102 or UTRAN 103 subsystems to be accessed when the GPRS 107 is replaced by the EPC 109.

One specific example of a user equipment is a Machine-to-Machine (M2M) device. Generally, M2M devices require less system resources as compared to regular wireless devices (e.g., smart phones). M2M devices typically engage in infrequent communications and in the transfer of small data.

Figure 2:
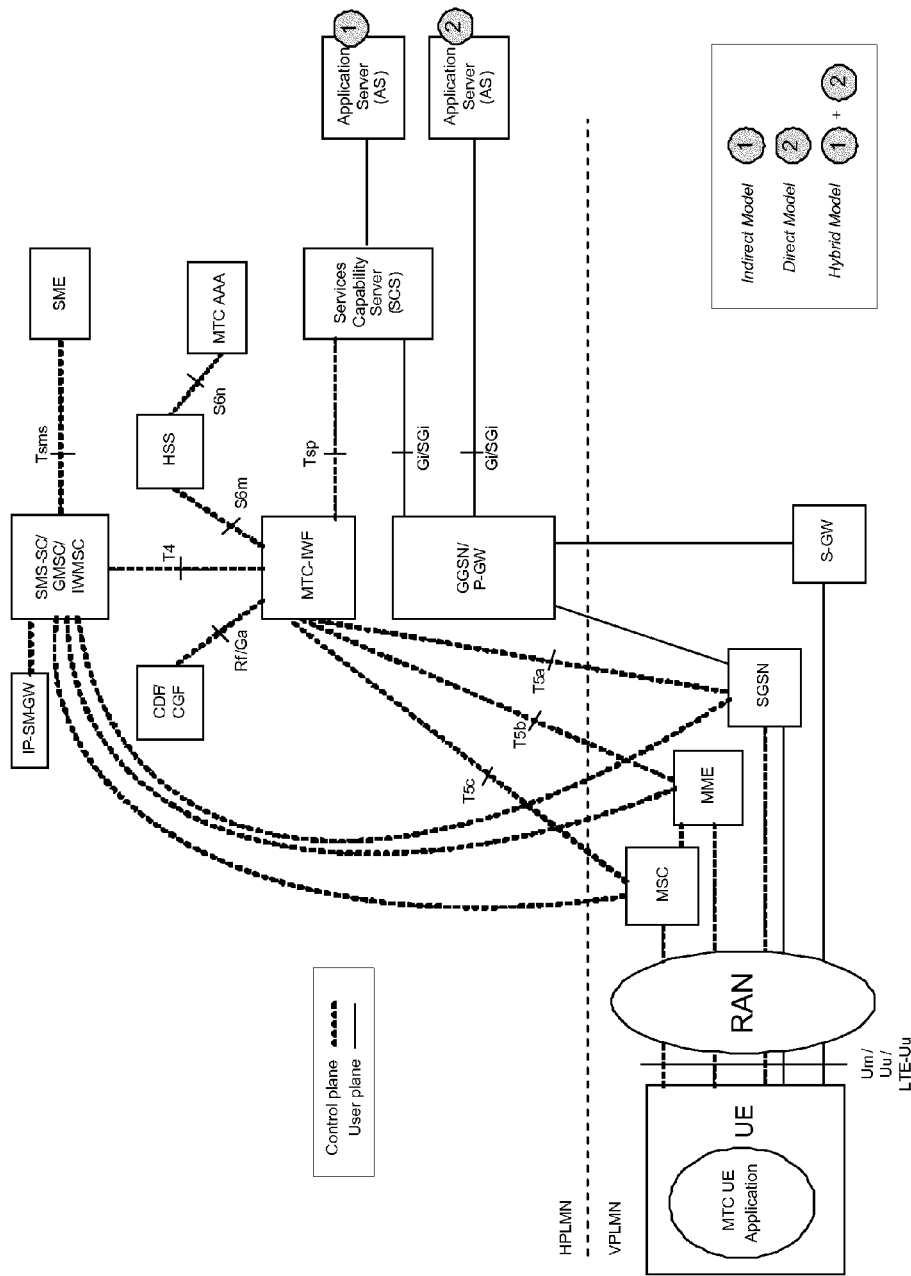
FIG. 2 is an illustrative example of a MTC based communications network.

FIG. 2 provides an example representation of a wireless network featuring M2M network elements where the dotted lines represent communication between modules or nodes in the control plane. The continuous lines represent communication in the user plane. Typically the network is operated and managed through signalling over the control plane and end-to-end data between the MTC UE (or M2M) device and its communication peers, for example, its SCS or application servers are conveyed over the user plane. End-to-end small data or messages between the MTC UE device and its communication peers may also be conveyed over the control plane using signalling, for example, using communication over a T5 interface. As illustrated in FIG. 2, a MTC UE application (e.g., associated with a M2M device) may communicate to an application server via a mobility management node and an MTC-IWF node.

The communication interface between the MME and the MTC-IWF is referred to as a T5, or specifically a T5b, interface. Typically, when a user equipment (or M2M device) wants to send communications or attach to the network, a message is sent to the mobility management node, in FIG. 2 this is the MME. If an MTC-IWF hasn't yet been assigned to the MTC UE device or is unknown to the MME, the MME will thereafter send a request to the HSS or HLR in order to determine an address of an appropriate MTC-IWF node for communications with the M2M device. Thereafter, the mobility management node may communicate with the MTC-IWF to complete the messaging sequence. Similarly, when a downlink data request is sent, the MTC-IWF may query a network node (e.g., the HSS or the HLR) to determine an identity and address of the mobility management node serving the M2M device for which the downlink data is intended for. Such means for communication are referred to as stateless mobility in this description.

Overview of the Example Embodiments

The problem with the currently specified system is how mobility should be handled in relation to T5 has not yet been described. For a M2M device that is mobile and moves to the coverage area of a new serving mobility management node, communication dependent on the T5 interface will be lost. There will also be MO generated messages in 3GPP Release 12, such that the mobility management node receives a message from the MTC UE which may be sent to the SCS or AS. The mobility management node needs to establish communication over a T5 interface and to know which MTC-IWF to send the message to. It is not effective if the mobility management node is required to interrogate the HSS/HLR for every message. An effective mobility management is needed in 3GPP Release 12.

Thus, some of the example embodiments presented herein are directed towards mobility management handling and how to reduce the number of HSS/HLR queries needed for T5 communications. The example embodiments presented herein provide two non-limiting means for providing communications management and for establishing direct T5 communications. The two examples provided herein are described under the sub-headings "State-full communications management" and "Semi state-full communications management". Example node configurations and corresponding operations are provided under the sub-headings "Example node configurations" and "Example node operations", respectively.

State-Full Communications Management

Accordingly, some of the example embodiments may provide a means for setting up a state-full interface over T5. In such an interface, a relation between the mobility management node and the MTC-IWF will be maintained throughout the attachment of the M2M device, from the point when the M2M device attaches to the system until the M2M device is detached, even when the end-points of the T5 communication link changes, for example, when the M2M device, due to mobility, changes a serving mobility management node. When the M2M device first attaches to the LTE/EPC system it sends an Attach message or request to the MME over NAS. For a MTC device attaching to an EPC system which has enabled small data or messaging over T5 (which may be indicated to M2M device in some way), the M2M device may provide an MTC indication (e.g., an information element or cause code), such that the MME will be notified to set up the T5 interface. This is a "Combined MTC Attach" over NAS. The MME will (e.g., using some selection method) select a IWF and send a MTC Attach Request message to the IWF.

When the MTC UE or M2M device moves to a new MME, according to some of the example embodiments, a new method called the Combined MTC TAU, may be utilized. The new Combined MTC TAU may comprise a new MTC-T5 indication such that the new MME will move the T5 connection from the old MME towards the new MME. In this way the T5 interface will be maintained. It should be appreciated that if the T5 ability of the M2M device is provided in the subscription data, a new MTC TAU need not be necessary. Instead, legacy messages may be utilized.

It should be appreciated that the MTC indication (or an indication that direct T5 establishment is possible) may be provided by the HSS/HLR in subscription data. It should further be appreciated that the establishment of T5 direct communications may be pending or suspended until there is an actual small data message from or for the M2M device.

Figure 3:
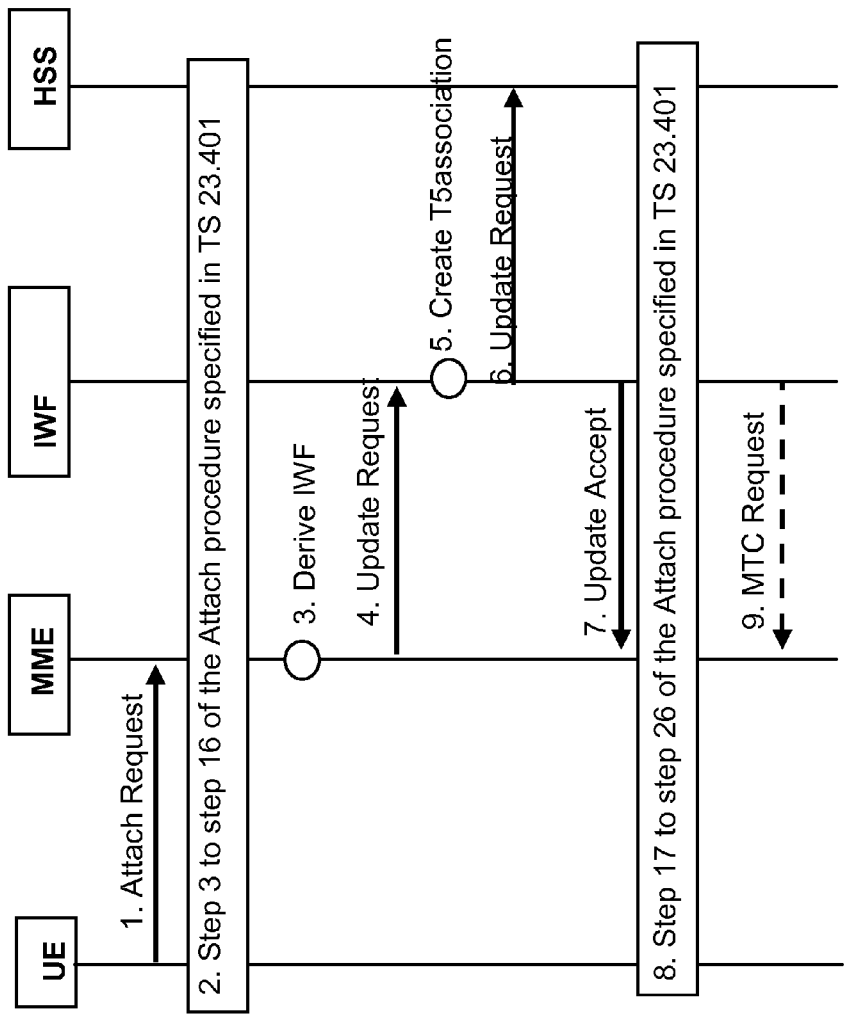

FIG. 3 illustrates a message sequence diagram of a state-full MTC Combined Attach Update Procedure, according to some of the example embodiments. First, a M2M device or user equipment may initiate an attach procedure may transmitting an Attach Request (message/step 1). The M2M device needs MTC service, a "MTC/T5 messaging" indication may be provided in the attach request.

Upon receiving the Attach Request, the MME may perform an attach procedure as provided in 3GPP specification (message/step 2). If the Attach Request message comprises an attach type, for example, indicating that the M2M device requests a MTC/T5 communication, the MME may allocate or derive a new MTC-IWF node (message/step 3). It should be appreciated that such an indication may be provided via subscription information. Thereafter, the MME may send an Update Request, which may comprise IMSI and the MME name, to the allocated MTC-IWF node (message/step 4).

Upon receiving the Update Request, the MTC-IWF node may create an association with the MME by storing the MME name or any other identification information of the MME or M2M device (message/step 5). Thereafter, the MTC-IWF may send an Update Request to the HSS to provide information on the new association (message/step 6). The MTC-IWF may also send an Update Accept message to the MME (message/step 7). Thereafter, the attach procedure may be finalized according to the 3GPP specification (message/step 8). Since the MTC-IWF has created an association with the MME (message/step 5), any future communications may be made with the MME directly, via T5, instead of sending a query to the HSS/HLR (message/step 9).

Figure 4:
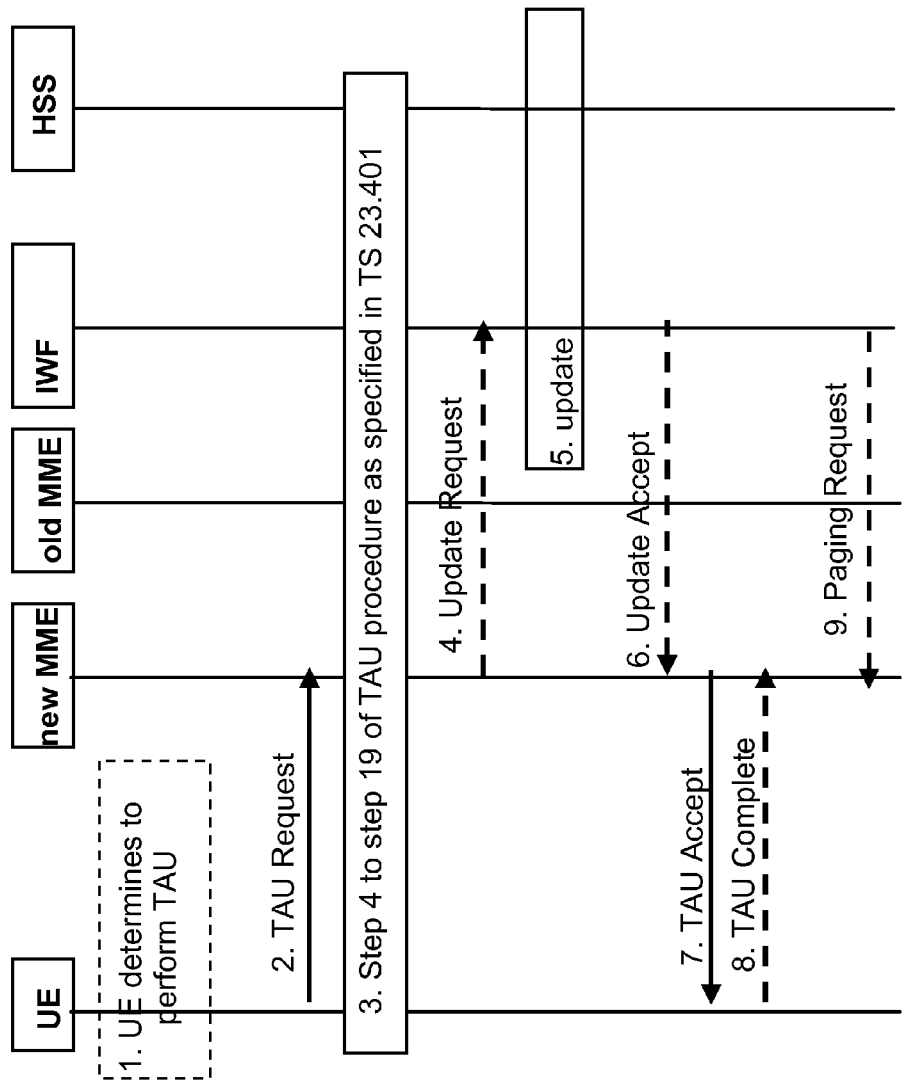
FIGS. 4-5 are message sequence diagrams depicting communications, according to some of the example embodiments presented herein.

FIG. 4 illustrates a message sequence diagram of a state-full MTC Combined TA Update to a New MME procedure, according to some of the example embodiments. First, the M2M device may perform a TAU (message/step 1). The M2M device may initiate the TAU procedure may sending a TAU request to the new MME (message/step 2). The TAU request may comprise any number of parameters. According to some of the example embodiments, the TAU request may comprise a "MTC/T5 indication" that direct T5 communications are requested.

Thereafter, an EPS TAU procedure may be provided as described in the 3GPP specification (message/step 3). The new MME may then send an Update Request to the MTC-IWF (message/step 4). It should be appreciated that message/step 4 may be omitted in the semi state-full embodiment which will be discussed further in the sub-heading below. The Update Request may comprise any number of parameters, for example an IMSI and the new MME name. According to some of the example embodiments, the new MME may receive information on which MTC-IWF node to send the request to via UE context information from the old MME or via a query to the HSS/HLR. The MTC-IWF may save any identifying information provided by the MME. It should be appreciated that the existence of the MTC-IWF address or any other indication in the UE context (or possibly from the HSS/HLR) may be an alternative way to inform the new MME to establish direct T5 communications instead of the M2M device providing such an indication.

Upon receiving the Update Request, the MTC-IWF may perform an update procedure with the HSS/HLR node (message/step 5). The MTC-IWF may also send an Update Accept message to the new MME (message/step 6). Thereafter, the new MME may send a TAU Accept message to the M2M device (message/step 7). According to some of the example embodiments, the TAU Accept message may comprise identifying information regarding the serving MTC-IWF node. The M2M device may thereafter send a TAU complete message to the new MME for the TAU procedure (message/step 8). As the MTC-IWF node has saved identifying information provided by the MME (e.g., via message/step 4), the MTC-IWF node may communicate with the MTC-IWF node directly (without making any additional queries) for future communications (message/step 9).

Semi State-Full Communications Management

According to some of the example embodiments, a means for providing, what is herein called, a semi state-full interface over T5 may be provided. Whenever the MME receives a trigger or a message to a M2M device from the IWF over the T5 interface, the MME may save the IWF address in the user equipment context information. When the MME gets a request from the M2M device to send a MO generated message it may use the saved IWF address instead of sending a query to the HSS/HLR. The MME will forward the MO message over T5 interface towards this IWF, which may send the message to the SCS over the Tsp interface.

When the M2M device moves to a new location, it may be registered in a new MME. The M2M device may send a TAU request towards the new MME and the new MME may request the old MME for user equipment context information. The old MME may send the UE Context Response comprising the IWF address to the new MME. The new MME may use the IWF address received in the user equipment context when there is a MO message from the MTC UE or M2M device, thereby eliminating the need for HSS/HLR queries for future communications. According to some of the example embodiments, the new MME may also send an Update Location message to the IWF.

If the IWF has outdated information about the serving node, for example, in a cache and sends a MT message to the old MME over T5, the old MME may return an error message to the IWF. An example of such an error message may provide an indication that the M2M device is not present in the MME. The IWF may then make a new query to the HSS to receive the current serving MME. Thereafter, the IWF may repeat the MT message to the new MME. Whenever the new MME receives a trigger or a message to a M2M device from the IWF over the T5 interface, and if the IWF address has changed, the new MME may save the IWF address in the UE context information.

Figure 5:
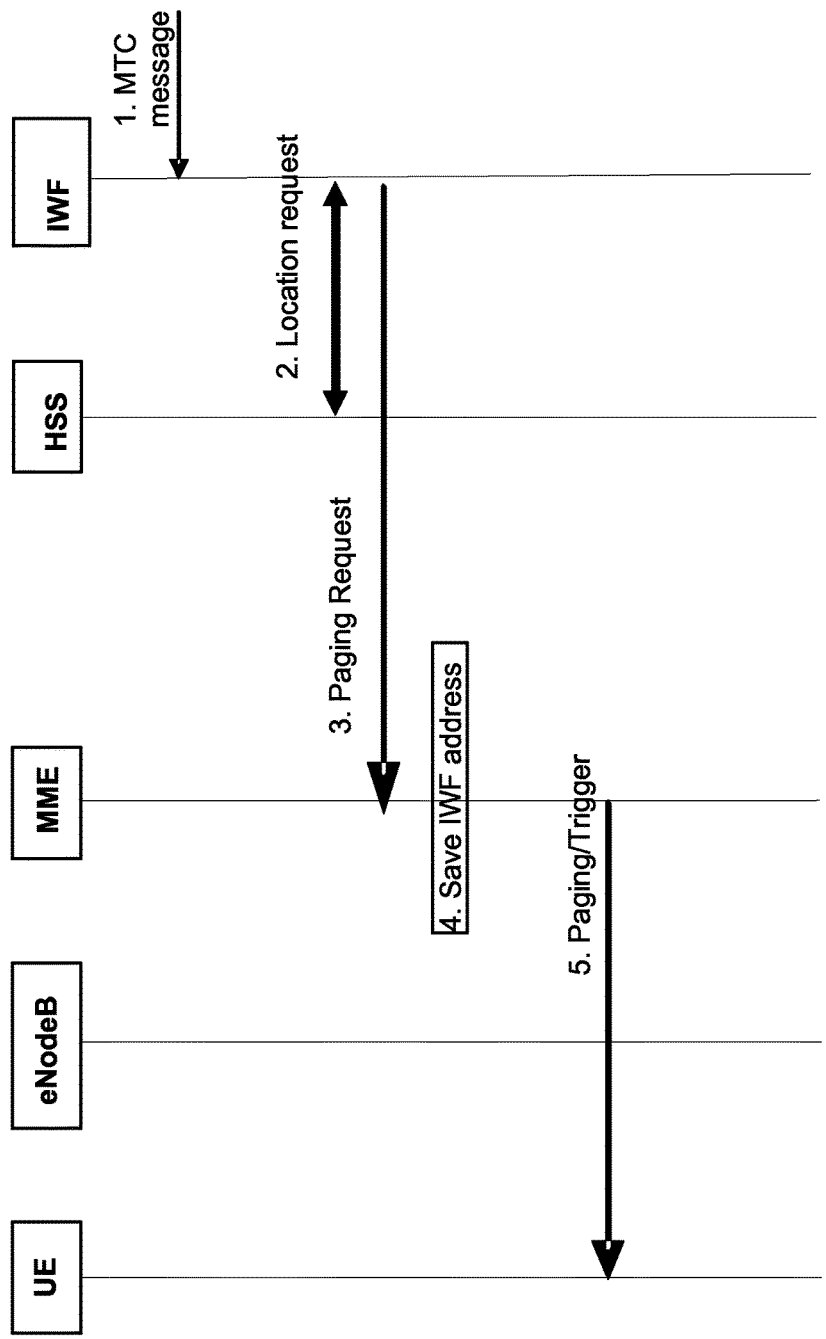

FIG. 5 illustrates a message sequence diagram of a semi state-full communications of a mobile terminating MTC idle mode, according to some of the example embodiments. First, the MTC-IWF node may receive a MTC message for the M2M device (message/step 1). The MTC-IWF node may receive routing information of the terminating M2M device from the HSS/HLR (message/step 2). Upon receiving the routing information, the MTC-IWF node may send a Paging Request for the M2M device via the MME (message/step 3). The Paging Request may comprise IMSI or any other identifying information of the M2M device and the MTC-IWF node. The MME saves the MTC-IWF node address, or any other form of identification, for later forwarding MO messages without making HSS/HLR queries. Thereafter, the MME sends a Paging to the M2M device.

Example Node Configurations

Figure 6:
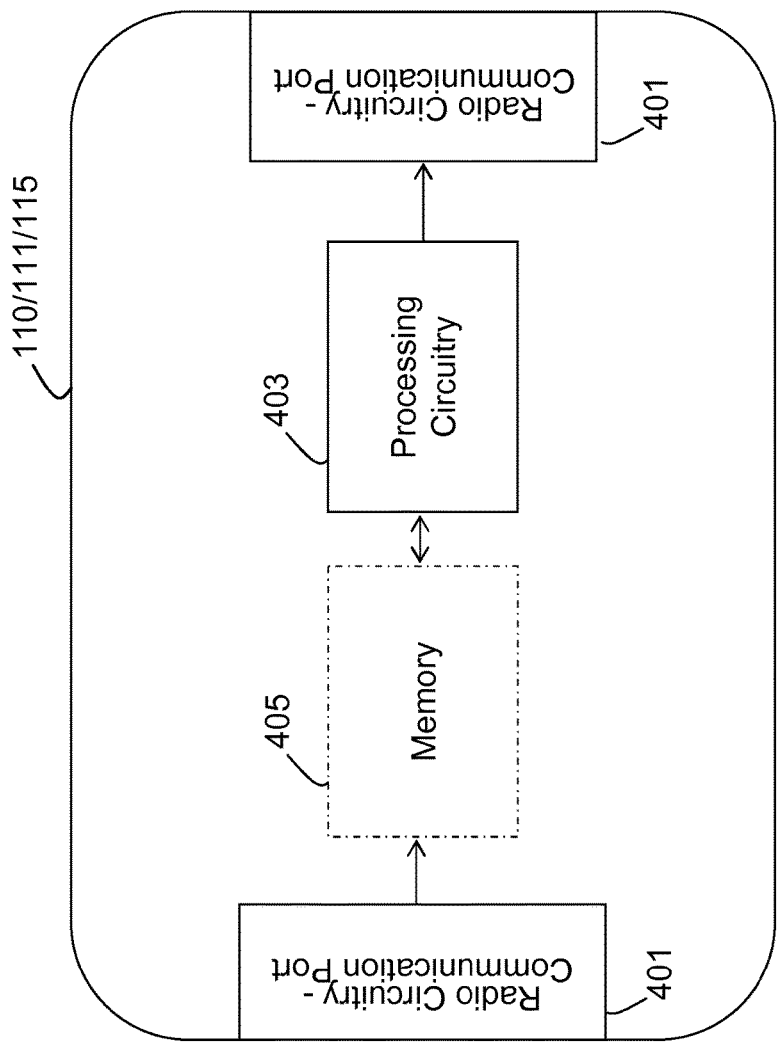
FIG. 6 is an example node configuration of a mobility management node, according to some of the example embodiments presented herein.

FIG. 6 illustrates an example node configuration of a mobility management node which may be a MME 115, a SGSN 111 or a S4-SGSN 110. The mobility management node may perform some of the example embodiments described herein. The mobility management node may comprise communication port or a communication port 401 that may be configured to receive and/or transmit communication data, instructions, and/or messages. It should be appreciated that the communication port 401 may be comprised as any number of transceiving, receiving, and/or transmitting units or circuitry. It should further be appreciated that the communication port 401 may be in the form of any input or output communications port known in the art. The communication port 401 may comprise RF circuitry and baseband processing circuitry (not shown).

The mobility management node may also comprise a processing unit or circuitry 403 which may be configured to provide direct T5 communications with an MTC-IWF node as described herein. The processing circuitry 403 may be any suitable type of computation unit, for example, a microprocessor, digital signal processor (DSP), field programmable gate array (FPGA), or application specific integrated circuit (ASIC), or any other form of circuitry. The mobility management node may further comprise a memory unit or circuitry 405 which may be any suitable type of computer readable memory and may be of volatile and/or non-volatile type. The memory 405 may be configured to store received, transmitted, and/or measured data, device parameters, communication priorities, and/or executable program instructions.

Example Node Operations

Figure 7:
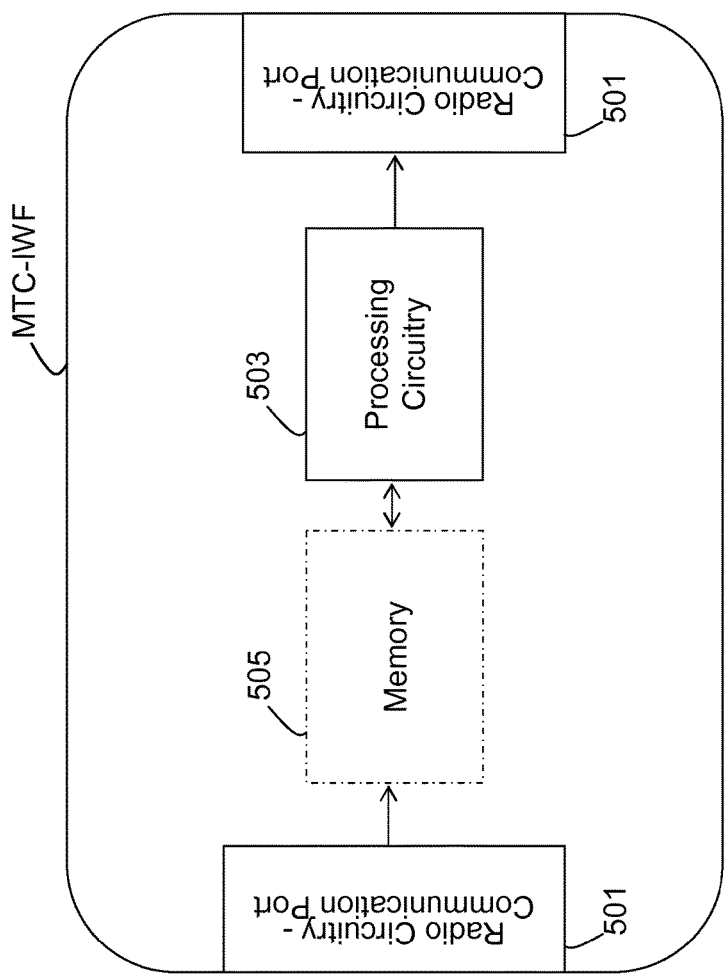
FIG. 7 is an example node configuration of a MTC-IWF node, according to some of the example embodiments presented herein.

FIG. 7 illustrates an example node configuration of a MTC-IWF node which may perform some of the example embodiments described herein. The MTC-IWF node may comprise radio circuitry or a communication port 501 that may be configured to receive and/or transmit communication data, instructions, and/or messages. It should be appreciated that the radio circuitry or communication port 501 may be comprised as any number of transceiving, receiving, and/or transmitting units or circuitry. It should further be appreciated that the radio circuitry or communication 501 may be in the form of any input or output communications port known in the art. The radio circuitry or communication 501 may comprise RF circuitry and baseband processing circuitry (not shown).

The MTC-IWF node may also comprise a processing unit or circuitry 503 which may be configured to provide direct T5 communications with an MTC-IWF node as described herein. The processing circuitry 503 may be any suitable type of computation unit, for example, a microprocessor, digital signal processor (DSP), field programmable gate array (FPGA), or application specific integrated circuit (ASIC), or any other form of circuitry. The MTC-IWF node may further comprise a memory unit or circuitry 505 which may be any suitable type of computer readable memory and may be of volatile and/or non-volatile type. The memory 505 may be configured to store received, transmitted, and/or measured data, device parameters, communication priorities, and/or executable program instructions.

Figure 8:
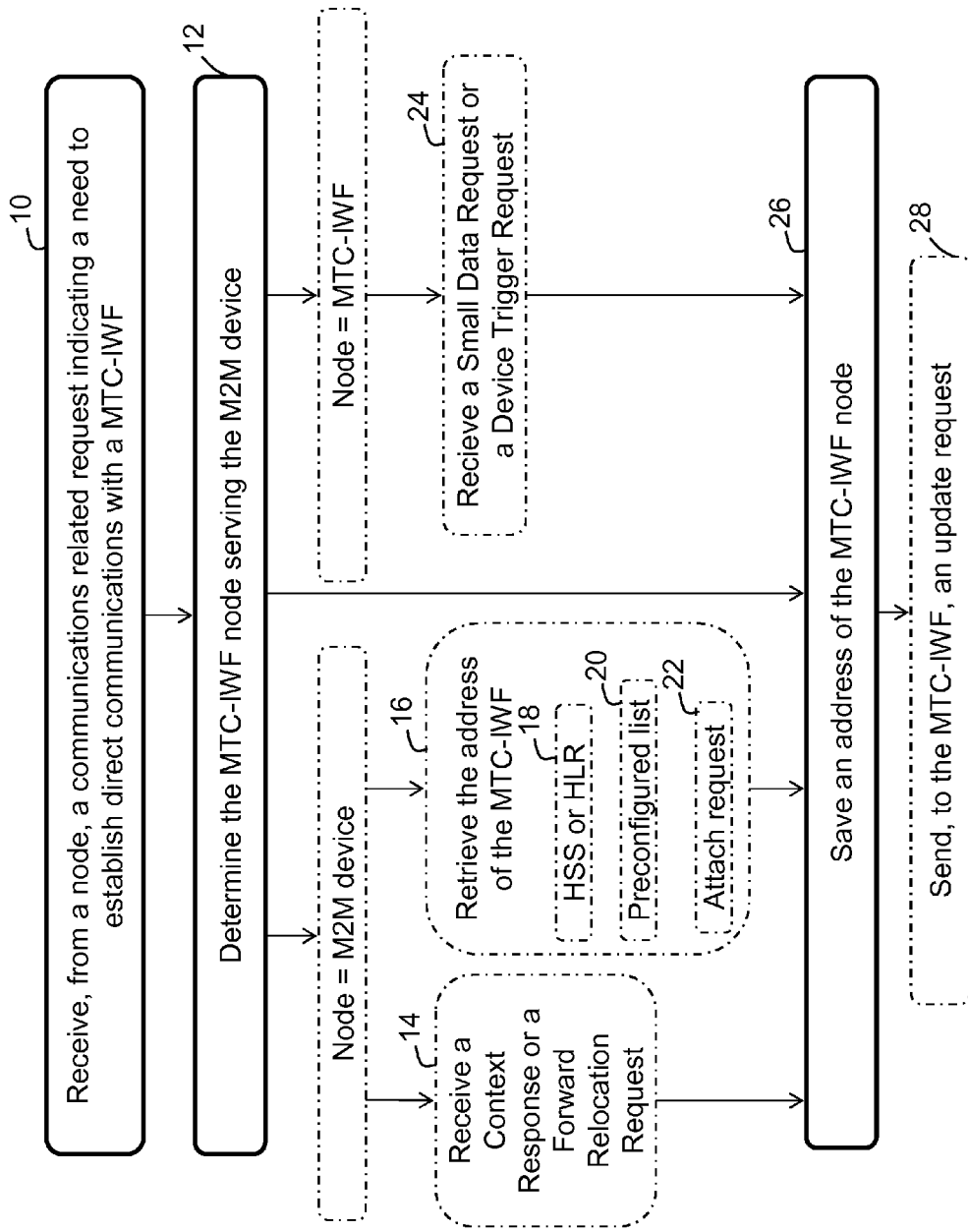
FIG. 8 is a flow diagram depicting example operations of the mobility management node of FIG. 6, according to some of the example embodiments.

FIG. 8 is a flow diagram depicting example operations which may be taken by the mobility management node as described herein for establishing direct T5 communications with an MTC-IWF node. It should also be appreciated that FIG. 8 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 10

The mobility management node is configured to receive, from a node, a communications related request comprising an information element indicating a need to establish direct communications between the mobility management node and the MTC-IWF node. The communication port 401 is configured to receive, from the node, the communications related request comprising the information element indicating the need to establish direct communications between the mobility management node and the MTC-IWF node. According to some of the example embodiments, the information element may be in the form of a flag, cause code, or any other means of notification.

Operation 12

The mobility management node is further configured to determine 12 the MTC-IWF node serving the M2M device, which is associated with the communications related request. The processing circuitry 403 is configured to determine the MTC-IWF node serving the M2M device.

Example Operation 14

According to some of the example embodiments, the node sending the communications related request is the M2M device and the communications related request is a TAU. In such example embodiments, the determining 12 may further comprise receiving 14, from a mobility management node currently serving the M2M device, a Context Response or a Forward Relocation Request comprising an address of the MTC-IWF node serving the M2M device. The communication port 401 may be configured to receive, from the mobility management node currently serving the M2M device, the Context Response or the Forward Relocation Request comprising the address of the MTC-IWF node serving the M2M device. Such an example embodiment is described further in at least FIG. 4 and the corresponding text.

Example Operation 16

According to some of the example embodiments, the node sending the communications related request is the M2M device and the communications related request is an attach request. In such example embodiments, the determining 12 may further comprise retrieving 16 an address of the MTC-IWF node serving the M2M device. The processing circuitry 403 may be configured to retrieve the address of the MTC-IWF node serving the M2M device. Such an example embodiment is described further in at least FIG. 3 and the corresponding text.

Example Operation 18

According to some of the example embodiments, the retrieving 16 may further comprise retrieving 18 the address from a HSS or a HLR. The processing circuitry 403 may be configured to retrieve the address from the HSS or the HLR.

Example Operation 20

According to some of the example embodiments, the retrieving 16 may further comprise retrieving 20 the address from a preconfigured list of MTC-IWF nodes. The processing circuitry 403 may be configured to retrieve the address form the preconfigured list of MTC-IWF nodes. According to some of the example embodiments, the preconfigured list of MTC-IWF nodes may comprise available MTC-IWF nodes to M2M devices based on a subscription, device identification, or any other parameters. The mobility management node may, for example, select a MTC-IWF from the preconfigured list randomly, or based on a Service Capability Server identity or an address found in the subscription information of the M2M device, or based on an External ID found in the subscription information of the M2M device. The mobility management node may also select the MTC-IWF based on the Type Approval Code TAC provided by the device at network attachment.

Example Operation 22

According to some of the example embodiments, the retrieving 16 may further comprise retrieving 22 the address from the M2M device in the attach request itself. The processing circuitry 403 may be configured to retrieve the address from the attach request itself.

Example Operation 24

According to some of the example embodiments, the node sending the communications related request may be the MTC-IWF node and the communications related request may be a Small Data Request or a Device Trigger Request. In such example embodiments, the determining 12 may further comprise retrieving 24 an address of the MTC-IWF node from the Small Data Request or Device Trigger Request. The processing circuitry 403 may be configured to retrieve the address of the MTC-IWF node from the Small Data Request or Device Trigger Request. This example embodiment is described further in at least FIG. 5 and the corresponding text.

Operation 26

The mobility management node is further configured to save, within the mobility management node, the address of the MTC-IWF node. The processing circuitry 403 is configured to save the address of the MTC-IWF node. Thus, upon saving the address, the mobility management node may engage in direct communications (via T5) with the MTC-IWF node, thereby avoiding unnecessary HSS/HLR queries.

Example Operation 28

The mobility management node may be further configured to send 28, to the MTC-IWF node, an update request comprising an address of the mobility management node and an identification of the M2M device. The update request may further comprise an indication that the address and the identification shall be saved within the MTC-IWF node. The communication port 401 is configured to send, to the MTC-IWF node, the update request comprising the address of the mobility management node and the identification of the M2M device. Thus, upon receiving this information, the MTC-IWF node may too engage in direct communications (via T5) with the mobility management node.

Figure 9:
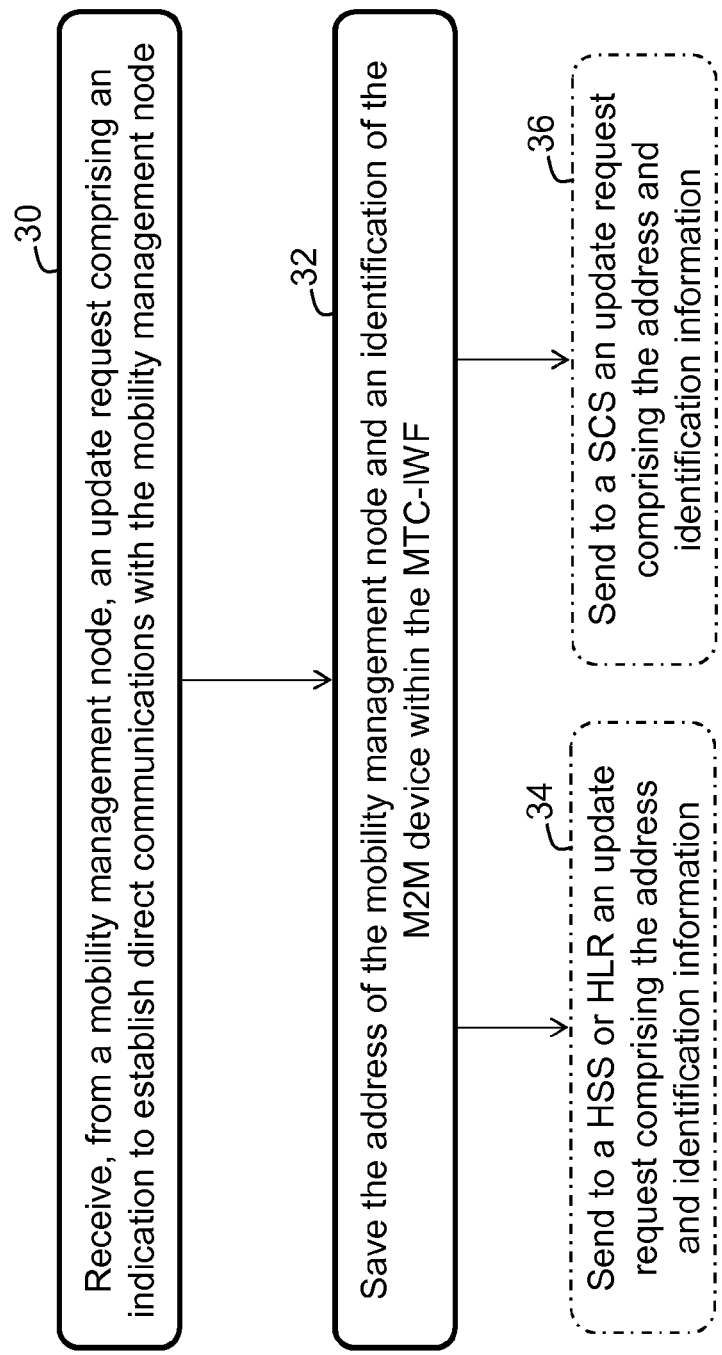
FIG. 9 is a flow diagram depicting example operations of the MTC-IWF node of FIG. 7, according to some of the example embodiments presented herein.

FIG. 9 is a flow diagram depicting example operations which may be taken by the MTC-IWF node as described herein for establishing direct T5 communications with an MTC-IWF node. It should also be appreciated that FIG. 9 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 30

The MTC-IWF node is configured to receive 30, from the mobility management node, an update request comprising an indication to establish direct communications with the mobility management. The update request further comprises an address of the mobility management node and an identification of the M2M device. The radio circuitry 501 is configured to receive, from the mobility management node, the update request comprising the indication to establish direct communications with the mobility management node. Such example embodiments are described further in at least FIGS. 3 and 4 as well as the corresponding text.

Operation 32

The MTC-IWF node is further configured to save 32 the address of the mobility management node and the identification of the M2M device within the MTC-IWF node. The processing circuitry 503 is configured to save the address of the mobility management node and the identification of the M2M device within the MTC-IWF node. Thus, upon saving such information, the MTC-IWF node may engage in direct communications (via T5) with the mobility management node.

Example Operation 34

The MTC-IWF node may be configured to send 34, to a HSS or HLR, an update request comprising an identity and address of the MTC-IWF node and the identification of the M2M device. The radio circuitry 501 may be configured to send, to the HSS or HLR, the update request comprising the identity and the address of the MTC-IWF node and the identification of the M2M device.

Example Operation 36

The MTC-IWF node may be configured to send 36, to a SCS, an update request comprising an identity and address of the MTC-IWF node and the identification of the M2M device. The radio circuitry 501 may be configured to send, to the SCS, the update request comprising the identity and address of the MTC-IWF node and the identity of the M2M device.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following summary of example embodiments.

The invention claimed is:

1. A method, in a mobility management node, for establishing direct communications between the mobility management node and a Machine Type Communication Interworking Function (MTC-IWF) node, the MTC-IWF serving a Machine-to-Machine (M2M) device, the method comprising:

the mobility management node receiving a communications related request transmitted by a node, wherein the node is one of the MTC-IWF node and the M2M device, the communications related request comprising an information element indicating a need to establish direct communications between the mobility management node and the MTC-IWF node;

after receiving the communications related request, the mobility management node obtaining an address of the MTC-IWF node serving the M2M device; and the mobility management node saving, within the mobility management node, the obtained address of the MTC-IWF node in association with an identifier of the M2M device, wherein saving the obtained address of the MTC-IWF node comprises storing context information for the M2M device, wherein the context information for the M2M device comprises the obtained address of the MTC-IWF node, and the method further comprises:

after saving the obtained address of the MTC-IWF node, the mobility management node receiving a message from the M2M device, the message comprising data for relay to an M2M server;

in response to receiving the message comprising the data for relay to the M2M server, the mobility management node transmitting the data towards the M2M server, wherein transmitting the data towards the M2M server comprises:

the mobility management node obtaining the address of the MTC-IWF node from the stored context information for the M2M device; and the mobility management node transmitting the data in a message addressed to the address of the MTC-IWF node.

2. The method of claim 1, wherein
the node is the M2M device,
the communications related request is a Tracking Area Update (TAU), and
obtaining the address of the MTC-IWF node comprises receiving, from a second mobility management node currently serving the M2M device, context information for the M2M device, said context information for the M2M device comprising said address of the MTC-IWF node serving the M2M device.

3. The method of claim 1, wherein the node is the M2M device and the communications related request is an attach request and the obtaining the address of the MTC-IWF node comprises retrieving the address of the MTC-IWF node serving the M2M device.

4. The method of claim 3, wherein retrieving the address comprises retrieving the address from one of: a Home Subscription Server and a Home Location Register.

5. The method of claim 3, wherein the retrieving the address comprises retrieving the address from a preconfigured list of MTC-IWF nodes.

6. The method of claim 3, wherein the retrieving the address comprises retrieving the address from the attach request.

7. The method of claim 1, further comprising sending, to the MTC-IWF node, an update request comprising an address of the mobility management node and an identification of the M2M device, said update request further comprising an indication that the address and the identification may be saved within the MTC-IWF node.

8. The method of claim 1, wherein
the node is the MTC-IWF node and the obtaining the address comprises retrieving the address of the MTC-IWF node from the communications related request, and
the communications related request is one of: a Small data Request and a Device Trigger Request.

9. The method of claim 1, where the mobility management node is a Mobility Management Entity (MME) in a 3GPP core network.

10. The method of claim 1, where the mobility management node is a Mobility Management Entity (MME) in a 3GPP core network.

11. A mobility management node for establishing direct communications between the mobility management node and a Machine Type Communication Interworking Function (MTC-IWF) node, the MTC-IWF serving a Machine-to-Machine (M2M) device, the mobility management node comprising:
a transmitter;
a receiver;
a memory; and
processing circuitry coupled to the memory, wherein the mobility management node is configured to:
determine an address of the MTC-IWF node serving the M2M device in response to receiving a communications related request comprising an information element indicating a need to establish direct communications with the MTC-IWF; and store in the memory the determined address of the MTC-IWF node such that the stored address is associated with an identifier of the M2M device, wherein the mobility management node is configured to store in the memory the determined address of the MTC-IWF node such that the stored address is associated with an identifier of the M2M device by storing in the memory context information for the M2M device, wherein the stored context information for the M2M device comprises the determined address of the MTC-IWF node, and the mobility management node is further configured to such that, after storing the context information for the M2M device and in response to receiving from the M2M device a message comprising data for relay to an M2M server, the mobility management node:

obtains the address of the MTC-IWF node from the stored context information for the M2M device; and transmits the data in a message addressed to the address of the MTC-IWF node.

12. The mobility management node of claim 11, wherein the node is the M2M device and the communications related request is a Tracking Area Update, TAU, and wherein the mobility management node is further configured to receive, from a mobility management node currently serving the M2M device, a Context Response or a Forward Relocation Request comprising an address of the MTC-IWF node serving the M2M device.

13. The mobility management node of claim 11, wherein the node is the M2M device and the communications related request is an attach request and wherein the mobility management node is further configured to retrieve an address of the MTC-IWF node serving the M2M device.

14. The mobility management node of claim 13, wherein the mobility management node is further configured to retrieve the address from a Home Subscription Server, HSS, or a Home Location Register, HLR.

15. The mobility management node of claim 13, wherein the mobility management node is further configured to retrieve the address from a preconfigured list of MTC-IWF nodes.

16. The mobility management node of claim 13, wherein the mobility management node is further configured to retrieve the address from the attach request.

17. The mobility management node of claim 11, wherein the mobility management node is further configured to send, to the MTC-IWF node, an update request comprising an address of the mobility management node and an identification of the M2M device, said update request further comprising an indication that the address and the identification may be saved within the MTC-IWF node.

18. The mobility management node of claim 11, wherein the node is the MTC-IWF node and the communications related request is a Small data Request or Device Trigger Request and wherein the mobility management node is further configured to retrieve an address of the MTC-IWF node from the Small data Request or Device Trigger Request.

* * * * *